United States Patent [19]

Hong et al.

[11] Patent Number: 5,301,032
[45] Date of Patent: Apr. 5, 1994

[54] DIGITAL IMAGE COMPRESSION AND DECOMPRESSION METHOD AND APPARATUS USING VARIABLE-LENGTH CODING

[75] Inventors: Min-suk Hong, Suwon; Yong-kyu Kim; Ku-man Park, both of Seoul, all of Rep. of Korea

[73] Assignee: Samsung Electronics Co., Ltd., Kyungki, Rep. of Korea

[21] Appl. No.: 986,061

[22] Filed: Dec. 4, 1992

[30] Foreign Application Priority Data

Apr. 7, 1992 [KR] Rep. of Korea .................. 92-5784

[51] Int. Cl.⁵ ........................................... H04N 1/415
[52] U.S. Cl. ................................. 358/261.2; 348/384
[58] Field of Search ................ 382/56, 50; 358/133, 358/432-433, 261.1-261.3

[56] References Cited

U.S. PATENT DOCUMENTS

| | | | |
|---|---|---|---|
| 5,021,891 | 6/1991 | Lee | 358/432 |
| 5,063,608 | 11/1991 | Siegel | 358/133 |
| 5,073,820 | 12/1991 | Nakagawa et al. | 358/133 |
| 5,107,345 | 4/1992 | Lee | 358/432 |

OTHER PUBLICATIONS

"A DCT (discrete cosine transform) Coding Scheme for Digital HDTV Recording", Fourth International Workshop on HDTV and Beyond, Turin, Italy, Sep. 4-6, 1991, vol. 1.11, pp., 43-51.

Primary Examiner—Stephen Brinich
Attorney, Agent, or Firm—Sughrue, Mion, Zinn, Macpeak & Seas

[57] ABSTRACT

Disclosed is a digital image compression and decompression method and apparatus for dividing a supplied digital image signal into blocks of predetermined size, performing variable-length coding of the signal, separating the signal with respect to principle information and remaining information, and controlling the record format so that each type of information is alternately recorded on a recording medium in an equal interval whenever recording the compressed information and decompressing the information, according to the reverse order, during decoding. Also, the function for extracting an activity in two steps during coding and then controlling the permitted number of bits of the variable length coding is provided. Accordingly, the coding efficiency is improved and the circuitry is simplified so that the price of the end product can be lowered.

28 Claims, 2 Drawing Sheets

FIG. 3
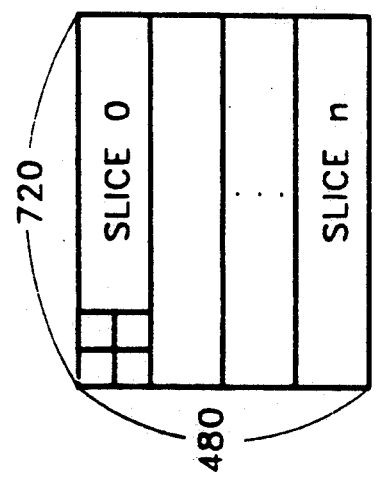
FIG. 2
FIG. 4
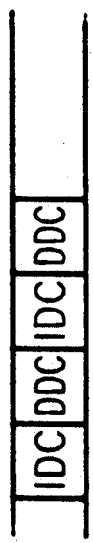

DIGITAL IMAGE COMPRESSION AND DECOMPRESSION METHOD AND APPARATUS USING VARIABLE-LENGTH CODING

BACKGROUND OF THE INVENTION

The present invention relates to a method and apparatus for compressing and decompressing a digital image signal using variable-length coding, and especially relates to a digital image compression and decompression method and apparatus for improving the image quality during reproduction of a recorded compressed digital image signal by controlling the format recorded on recording media, and also improving the compression efficiency by determining a permitted bit number and a quantization interval by extracting an activity, during variable-length coding of digital video images containing motion.

Generally, an image compressing method is proposed to efficiently process data of the digital image signal, and is divided into a variable-length coding (VLC) method and a fixed-length coding (FLC) method according to quantized method. In the VLC method for coding the linearly quantized coefficient by assigning a code having a variable length, since the number of bits to be coded is not constant, the chances of mutual influence between the coding units are increased unless the format recorded on the recording media is properly controlled, so that the possibility of error is also increased when performing trick-play operations such as editing and high-speed reproducing.

In the fixed-length coding method for coding a coefficient according to an adaptive quantizing by assigning a code having a constant length, since there is no influence between the coding units, the possibility of error is low during reconstructing, but since the recorded information is limited, the image quality when reconstructing is lowered. That is, if the length of the fixed length code is long, the image quality is good during general reconstructing, but the image quality is bad during trick playing. On the other hand, if the length of the fixed length code is short, the image quality is bad during general reproducing but the image quality is good during trick play. However, when the length of the FLC is long, the image quality during general reproducing is lower than that of the VLC method.

Since, so far, each coding method has been applied to the image compression method separately, compression has been less efficient. Especially, during trick playing, playback is almost impossible. To improve this problem, P. Kauff et al. of Germany disclosed a solution for alternative recording by performing both the VLC and the fixed-length coding during recording, through "A DCT (discrete cosine transform) Coding Scheme for Digital HDTV Recording" (Fourth International Workshop on HDTV and Beyond, Torino, Italy, Sep. 4-6, 1991, Vol. 1.11, pp 43-51). Here, the principle information (including the DC coefficient and low frequency AC coefficients within the block) in a predetermined block unit is fixed-length-coded using an adaptive quantizing output, and then recorded on a predetermined region of recording media. Also, the remaining information (including a high frequency AC coefficients) undergoes variable-length coding using a linear quantization and then is recorded on the remaining region not recorded with the fixed-length code at a recording region on the recording medium assigned to the block (segment unit). The principle information in the next block is recorded on the predetermined recording region assigned to the block as described above, and the remaining information is recorded next to the region of the previous block where the variable-length coding (VLC) is recorded. In other words, under the condition that the region of a recording medium where the FLC and the VLC can be recorded is limited, during recording of the information onto the fixed length coding region and the VLC region assigned to the respective blocks, if the number of bits of the VLC information in the previous block is more than that of the corresponding region, the VLC is recorded onto the region where the VLC of the next block would otherwise be recorded, while, if the number of bits is less than that of the corresponding region, the VLC of the next block is recorded next to the region where the previous VLC was recorded. Accordingly, the image quality is improved compared to the case which adapts the two coding methods separately.

However, in this case, since the coding efficiency is lower than that of VLC, even though the region to be reproduced is widened by fixed-length-coding the principle information, the image quality of the principle information is lowered and the apparatus becomes complicated because of the use of two different coding methods, which increases the price of the end product.

SUMMARY OF THE INVENTION

The object of the present invention is to provide a digital image compression and decompression method and apparatus for performing VLC upon the principle and remaining information (as defined above) in a predetermined block respectively, and controlling the record format to alternatively record the information on recording media by a constant interval, thereby improving the coding efficiency.

Another object of the present invention is to provide an image compressing and decompression method and apparatus for extracting the activity of the information to be compressed, predicting the number of output bits for performing VLC, and controlling the quantization step size, thereby improving the coding efficiency.

To achieve the above object of the present invention, an image compression coding method for compressing the supplied digital image signal, performing a discrete cosine transform (DCT) of the signal, linearly quantizing the signal, and performing VLC in order to improve the recording efficiency, comprises the steps of:

detecting regions of the principle and remaining information by counting the number of bits generated by performing VLC; and controlling the record format to alternately record onto recording media in an equivalent interval the principle information and the remaining information among the information generated by performing VLC in units of a block of a predetermined size according to the regions detected in the region-detecting step.

In accordance with the present invention, there is provided a digital image compression apparatus for compressing the digital image signal to improve the recording efficiency, comprising: a DCT unit for performing DCT upon a supplied digital image signal; a quantization unit for linearly quantizing the transform coefficient generated from the DCT unit; and a VLC processor for performing VLC upon the quantized coefficient generated from the quantization unit.

The digital image compression apparatus further comprises: a record format controller for controlling the format recorded in accordance with the number of coded bits generated by the VLC processor; and a recorded information classifying unit controlled by the record format controller for classifying the coded information output from the VLC processor into the principle information and the remaining information, and processing the principle and remaining information through respective processing paths.

To achieve the above other objects of the present invention, there is provided a digital image compression coding method for compressing a supplied digital image signal, performing a DCT upon the signal, linearly quantizing the signal, and performing VLC in order to improve recording efficiency, which comprises the steps of:

first extracting an activity by dividing the digital image signal into subframes and then detecting the activities of the subframes;

second extracting an activity by accumulatively operating the result extracted in the first activity extracting step and then extracting the activity in units of a frame;

first bit allocating to assign the bits in units of the subframe by the activities extracted in the first and second activity extracting steps;

third extracting an activity to extract the activity of a predetermined block by the quantized coefficient; and second bit allocating to assign the number of bits corresponding to the block based on the activity of the block extracted in the third activity extracting step and on the number of bits assigned in the first bit allocating step.

In accordance with the present invention, there is provided an image compression apparatus including: a DCT unit for performing a DCT of the digital image signal;

a quantizing unit for linearly quantizing the transform coefficient generated from the DCT unit;

a VLC processor for performing VLC of the quantized coefficient generated from the quantizing unit;

a first activity-extractor for dividing the digital image signal into subframe units and then detecting the activity of each subframe;

a second activity-extractor for accumulatively operating the result extracted in the first activity-extractor and then extracting the activity in units of frames;

a first bit-allocator for allocating the bits in the subframe unit by the activity extracted in the first and second activity extractors;

a third activity-extractor for extracting the activity of the predetermined block by the quantized coefficient; and a second bit allocator for assigning the number of bits corresponding to the block based on the activity of the block extracted in the third activity-extractor and on the number of bits assigned in the first bit allocator.

There is provided an image decompressing method for decoding the principle and remaining information recorded on the separated regions after performing VLC of a digital image signal, the method comprising the steps of:

merging the reproduced signals to restore the information allocated and recorded on the separate regions, in units of predetermined blocks according to the number of coded bits of the predetermined blocks; and restoring the image data by variable-length-decoding according to the merging order in the merging process, inverse quantizing the restored data and performing IDCT.

In accordance with the present invention, there is provided an image decompressing apparatus for respectively performing VLC of a digital image signal according to, respectively, the principle information and the remaining information, and decoding the information recorded on the separated regions, the apparatus comprising: a merging unit for merging the reproduced signal to restore the information allocated and recorded on the separate regions, in units of predetermined blocks according to the number of coded bits of the predetermined block unit;

a variable-length-decoder for variable-length-decoding according to the merging order in the merging unit; and a restoring unit for restoring the bits decoded in the variable-length-decoder by inverse-quantization and IDCT (inverse discrete cosine transform).

BRIEF DESCRIPTION OF THE DRAWINGS

The above and other objects, features and advantages of the present invention will become apparent from the following description taken in conjunction with the accompanying drawings throughout which like references designate like elements, and in which:

FIG. 2 shows an extracting unit formed in the first activity extractor illustrated in FIG. 1;

FIGS. 3A and 3B show an operational object of an image in a frame unit and an edge-detecting operator used to activity-extract; and FIG. 4 shows the recording format on a recording medium.

DETAILED DESCRIPTION OF THE INVENTION

Figure 1:
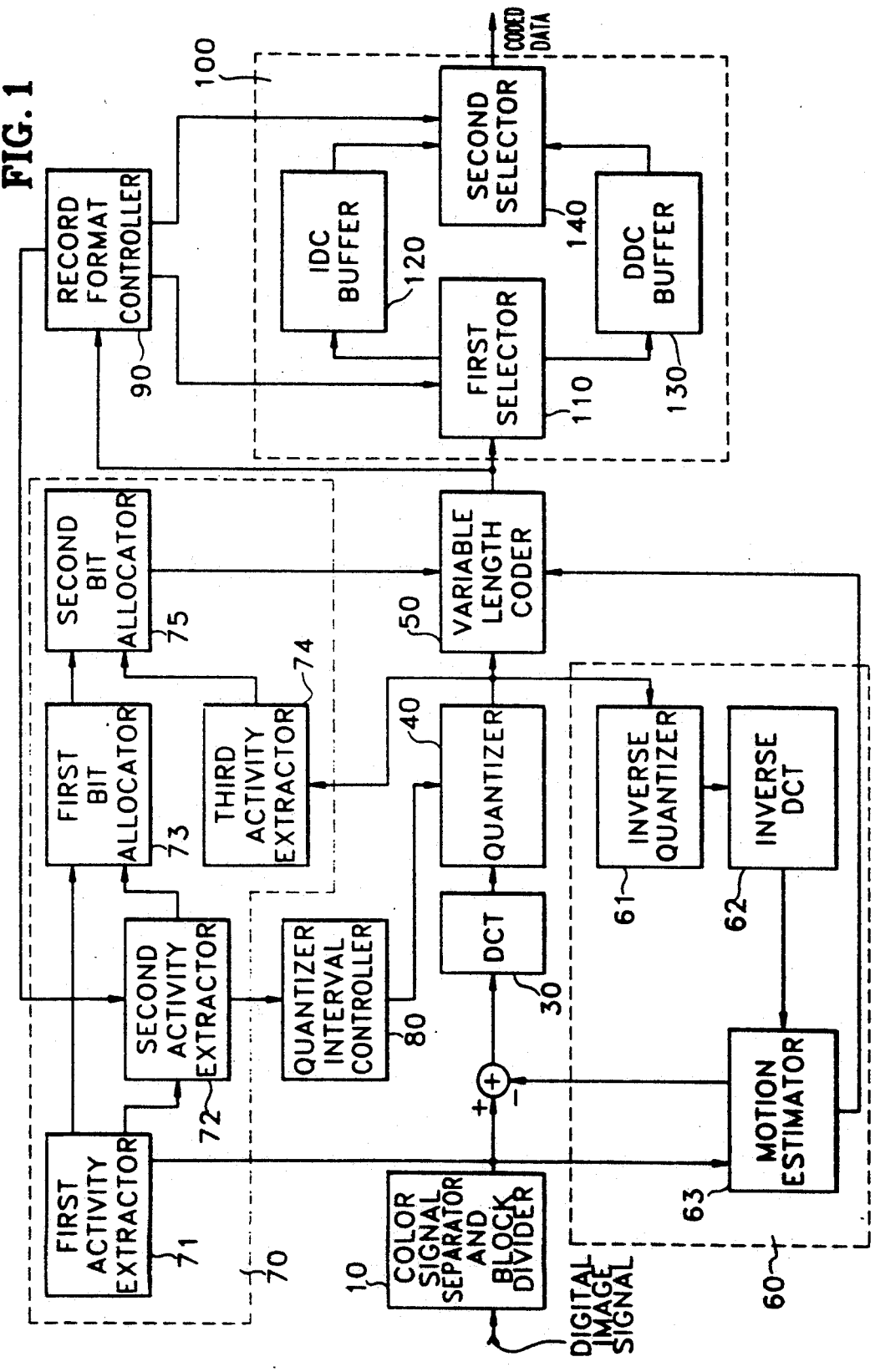
FIG. 1 is a block diagram of a digital image compression apparatus according to the present invention.

FIG. 1 is a block diagram of a digital image compression apparatus according to the present invention, being applied to motion image sequences.

Shown in FIG. 1 is a color signal separator and block divider 10 for separating the supplied composite signal into luminance and chrominance component signals, and dividing a block by a predetermined size, a DCT processor 30 for performing DCT upon the signal output from the color signal separator and block divider 10 by a coding unit, a quantizer 40 for quantizing the DCT coefficient generated from the DCT processor 30, a motion-estimating unit 60 for reducing the redundancy between a neighboring frame by the DCT coefficient quantized in quantizer 40 and the signal output from color signal separator and block divider 10, an adder 20 for obtaining the difference of the output signal of the motion-estimating unit 60 and the currently input signal output from color signal separator and block divider 10, a bit-allocating unit 70 for allocating the coding bits on the bases of the outputs from the color signal separator and block divider 10 and the quantizer 40, a quantizer interval controller 80 for controlling the quantization interval of quantizer 40 in response to the extracted amount of activity of a frame unit output from the bit-allocating unit 70, a VLC processor 50, controlled by the output signals of the bit allocating unit 70 and the motion estimating unit 60, for performing VLC upon the quantized coefficient, output from quantizer 40, a record format controller 90 for counting the bits of coded information generated from the VLC processor 50 and then informing the bit-allocating unit 70 of the current number of coded bits to control the quantization interval, and a recorded information classifying unit 100, controlled by the output signal of the record format controller 90, for separating the coded information output from the VLC processor 50 into an independent decodable code (IDC) and a dependent decodable code (DDC) and for dividing the recorded information to be recorded onto recording media.

In detail, the motion-estimating unit 60 includes an inverse quantizer 61 for inversely quantizing the quantized coefficients output from quantizer 40, an inverse discrete cosine transform (IDCT) processor 62 for inversely performing DCT upon the inversely quantized coefficients generated from the inverse quantizer 61, and a motion estimator 63 for outputting to the adder 20 a signal indicative of a motion estimate between a previous frame output from a frame memory (not shown) that stores the restored signal output from the IDCT processor 62 and a supplied present frame generated by the color signal separator and block divider 10, and for outputting an estimated motion vector into the VLC processor 50.

The bit-allocating unit 70 includes a first activity extractor 71 for dividing one frame signal output from the color signal separator and block divider 10 into subframes (slice units) on the basis of 16 lines, and then extracting the activity of each subframe by employing an edge-detection mask, a second activity-extractor 72 for adding the information extracted from first activity-extractor 71 in the unit of frame, extracting the activity of the frame, and then outputting the quantization step size information by means of a control signal indicative of the number of previous coded bits from the record format controller 90, a first bit-allocator 73 for outputting the number of the allocated bits corresponding to the slice unit by means of the output signals from the first and second activity-extractors 71 and 72, a third activity-extractor 74 for extracting the activity of the block unit within the predetermined coding unit from the signal output from the quantizer 40, and a second bit-allocator 75 for outputting into the VLC processor 50 the number of bits allocated to the block by means of the signals output from first and third activity-extractors 73 and 74.

The recording information classifying unit 100 includes an IDC buffer 120 for buffering the principle information among the coded information output from VLC processor 50, a DDC buffer 130 for buffering the remaining information (i.e., the information other than the aforementioned principle information), a first selector 110 for selectively outputting the signal output from the VLC processor 50 and controlled by the output signal of the record format controller 90 into the IDC buffer 120 and the DDC buffer 130, and a second selector 140 controlled by the record format controller 90 to alternately select the signals output from the IDC buffer 120 and the DDC buffer 130 to alternately record the signals onto a recording medium.

FIG. 2 shows the unit for extracting the activity in the first activity-extractor 71. If the size of the block for coding is 8×8, the slice unit (subframe) becomes 16×720. Namely, eight pixels in the vertical direction of the frame become one line, and the next eight pixels become another line, so that the first and second lines become the first slice unit (slice 0). The region included in the next slice unit is for the aforementioned second line and the next or third line. The activity is extracted by slicing one frame according to the above method.

FIGS. 3A and 3B show an edge-detecting operator used during extracting an activity according to a slice formed in the first activity-extractor 71 of the bit-allocator 70, and a partial image where an operator is applied. Here, the operator corresponds to one pixel.

FIG. 4 shows the format recorded on a recording medium after being allocated by the recording information classifying unit 100, wherein a dependent decodable code (DDC) cannot be self-decoded and is decoded only if the IDC is decoded.

Now, the operation of the present embodiment will be explained. Here, parts which are similar to those of the conventional apparatus are explained only briefly.

The color signal separator and block divider 10 separates the input video signal into luminance and chrominance signals according to a commonly known process. That is, after the signal is separated into blocks having a predetermined size, luminance and chrominance signals are output sequentially. Here, the chrominance signal is sub-sampled, as discussed above, during the separation process. The signal output from the color signal separator and block divider 10 is a digital signal.

The adder 20 obtains and outputs the difference of the output signal of the color signal separator and block divider 10 and the motion estimated signal detected from the motion-estimating unit 60 (described later). At this time, since the recording unit is two frames in the present embodiment, if corresponding to a first frame period, the output signal of the color signal separator and block divider 10 is output into the DCT processor 30 (described later) via the adder 20, but if corresponding to the next frame period, the adder 20 detects the difference of the output signal of the motion-estimating unit 60 and the output signal of the color signal separator and block divider 10 and outputs that difference into the DCT processor 30.

Here, the video signal processed in correspondence with the first frame period is an intraframe, while the video signal processed in correspondence with the next frame period is a predicted frame. Accordingly, the intraframe is the signal consisting of only the frame information output from color signal separator and block divider 10, when motion estimating unit 60 is not operated. The predicted frame is the signal of the difference between the information of the aforementioned next one frame and the motion-estimated signal output from motion estimating unit 60 (i.e., the difference signal between video information corresponding to the aforementioned intraframe and video information supplied to the next frame; which will be explained in detail with respect to the motion estimating unit 60).

The DCT processor 30 and quantizer 40 perform similarly to their corresponding elements in the conventional apparatus. Here, the quantizer 40 linearly quantizes by the quantization step size provided from the quantization step size controller 80 (described later).

The motion-estimating unit 60 estimates the movement in the picture by comparing the decoded signal corresponding to one frame output from quantizer 40 with the signal corresponding to the next frame output from the color signal separator and block divider 10. If the information output from the color signal separator and block divider 10 is an intraframe, the output signal of the quantizer 40 is output to the VLC processor 50 and simultaneously stored in the frame memory (not shown) via the inverse quantizer 61 and the IDCT processor 62 for the motion estimation with a next frame. Then, in order for the frame sequentially output from the color signal separator and block divider 10 to be coded as a predicted frame, the output signal of the color signal separator and block divider 10 is supplied to the motion estimator 63 of the motion-estimating unit 60 as well as to the adder 20.

The motion estimator 63 sets a predetermined size (for example, 16×16) as a matching block in respect to a previous frame stored in frame memory (not shown), obtains the difference with respect to all of the pixels within a predetermined block in order to find out the portion most similar to the currently input frame signal, and accumulatedly adds the absolute values of the differences. Such an operation is repeated by changing the predetermined block one by one pixel within a searching range (for example, from −8 to +8). As a result, the portion having the smallest accumulated sum is the most similar one. The information in that portion is transmitted to the VLC processor 50 as a motion vector, and the portion's video signal is output to the adder 20 which obtains the difference from the currently input information, to be supplied to the DCT processor 30. Here, since the signal input to the DCT processor 30 is obtained by finding out the image of the past frame which is most similar to that of the current frame and operating on the difference between the two, the information amount of the signal is very small. This signal is also coded via the quantizer 40 and the VLC processor 50.

Meanwhile, the bit-allocating unit 70 allocates the bits by slice unit, and then allocates the bits by DCT blocks, thereby controlling the number of permitted VLC bits by means of two steps of bit-allocation. First of all, the output signal of the color signal separator and block divider 10 is presented in two-dimensional orthogonal coordinates, wherein the gradient of a picture f(x,y) for an arbitrary pixel (x,y) is represented as a two-dimensional vector.

$$G[f(x,y)] = \begin{pmatrix} Gx \\ Gy \end{pmatrix} = \begin{pmatrix} \frac{\partial F}{\partial x} \\ \frac{\partial f}{\partial x} \end{pmatrix} \quad (1)$$

Here, the direction of vector G indicates the changing direction of "f" which is maximized at the position (x,y). To extract the contour of the picture, only the magnitude of the vector at the corresponding position is required. The magnitude is the same as the maximum increasing rate of f(x,y) per unit distance in the G direction. These can be closer to each other by their absolute value, which can be expressed by the relationship between the horizontal and vertical directions as follows:

$$\begin{aligned} G[f(x,y)] &= [Gx^2 + Gy^2] \\ &= |Gx| + |Gy| \\ &= |f(x,y) - f(x+1,y)| + |f(x,y) - f(x,y+1)| \end{aligned} \quad (2)$$

The gradient is calculated by a partial derivative function with respect to every pixel of the supplied digital image.

Among several methods for extracting the contour according to the equation (1), the activity is extracted using an edge-detection operation which adopts the edge-detection mask as shown in FIG. 3A. That is, the supplied digital image signal is partitioned in a slice unit as shown in FIG. 2, and the pixel within the block sliced by the slice-unit is partitioned again as shown in FIG. 3B in order to apply the mask shown in FIG. 3A, and then the gradient can be calculated as below.

$$Gxy = |x1 - x2| + |x1 - x3| \quad (3)$$

The x1, x2, x3, and x4 shown in FIG. 3A are the gray level at an arbitrary position (x,y).

The first activity-extractor 71 carries out the edge-detection operation upon the sliced pixel in the slice unit per frame, followed by accumulative summing for obtaining the slice activity as in the following equation.

$$ACT_{slice} = \sum_{y=0}^{Sy} \sum_{x=0}^{Sx} Gxy \quad (4)$$

Here, Sx and Sy are the size of the slice. When the activity (ACT slice) is extracted by the edge detection algorithm in the slice unit as described above, the second activity-extractor 72 extracts the activity in the frame unit and compares it with the activity extracted in the previous frame, thereby determining the quantization interval which most closely matches the number of output bits.

In more detail, the second activity extractor 72 allocates a predicted number of outputs bits for fixing bits by a forward control method. At this time, since the bits fixed on a recording medium are formed of an intra-frame and predicted frame as one unit, the quantization step size is determined with respect to only the intra-frame, and the same quantization step size obtained in the intraframe is used for the predicted frame. The quantization step size is controlled to be as near as possible to the objective output bit rate. Thus, the value of quantization step size is incremented when the frame activity is high since the picture is then complicated and the output bit rate is high. Conversely, the value of quantization step size is decremented when the frame activity is low, since the picture is simple and thus the output bit rate is low. The relation between the frame activity and the quantization step size is obtained statistically by experimentation. The frame activity (ACT-frame) is obtained by summing the slice complexity, which can be written as:

$$ACT_{frame} = \sum_{i=0}^{N} ACT_{slice} \quad (5)$$

where N is the total number of the slices within a frame. The following Table 1 gives an example of the relation between the frame activity and the scaling factor which determines quantization step size. Here, since the picture is changing, the previous frame has less correlation with the current frame, so that the scaling factor must be set again.

TABLE 1

Relation Between Frame Activity and Scaling Factor

| frame activity | scaling factor |
|---|---|
| 0 | 4.3 |
| 10 | 4.2 |
| 20 | 4.1 |
| 30 | 3.9 |
| 40 | 3.7 |

Since errors occur to some degree per each picture, and the frame to be coded next is similar to the previous frame in the case of a motion picture, the quantization step size can be precisely predicted by the information with respect to the amount of bits generated during the encoding of the previous frame. The previous frame activity which is predicted according to the amount of bits output from the record format controller 90 to be described later is compared with the currently coded frame activity which is detected by the activity of the slice extracted from the first activity extractor 71, thereby distinguishing successive pictures and the change of pictures. In other words, using the bit amount information output from the record format controller 90 as a reference, if the result of the subtraction of the extracted activity values to the previous frame and current frame is less than a reference value, the quantization interval is compensated. Otherwise, if the result of the subtraction is greater than the reference value, the quantization step size is reset. While resetting, the scaling factor can be set as shown in Table 1, and the scaling factor compensating value is set as shown in Table 2.

TABLE 2

| Scaling factor compensating value | |
|---|---|
| error of coded bits in previous frame | compensating value of scaling factor |
| −250000 | +0.5 |
| −200000 | +0.4 |
| −150000 | +0.3 |

The first bit-allocator 73 outputs the number of allocated bits for each slice according to the slice activity extracted in the first activity-extractor 71 with respect to the frame activity extracted in second activity-extractor 72, where the output bits are fixed at intervals of two frames. This is because the intraframe and predicted frame are coded as one unit in this embodiment of the present invention. Here, the intraframe is an original image and the predicted frame is the frame by motion compensation. The encoding of the intraframe is carried out by the quantization step size obtained by approximation without fixing the bits, while the permitted amount of bits is fixed for the predicted frame while carrying out VLC. Therefore, while coding the predicted frame, the permitted number of bits is allocated in accordance with the result of activity extraction. Then, upon exceeding the permitted number of bits during encoding, the bit-coding stops, thus fixing the number of bits.

When the output bit rate is 20 Mbps, the amount of bits fixed with respect to one intraframe and one predicted frame is defined as below.

$$ABIT_{iframe+pframe} = 20 \text{ Mbps}/15 \text{ frames} \quad (6)$$

Since the intraframe greatly affects the reproduced picture quality, the number of bits is not fixed, while the predicted frame does not have a great influence, so that the number of predicted frame bits is allocated and fixed. Thus, the amount of bits allocated to the predicted frame is as follows:

$$ABIT_{pframe} = ABIT_{iframe+pframe} - ABIT_{iframe} \quad (7)$$

The activity of slice-unit which represents the slice activity of a whole picture can be allocated by its ratio with the frame activity. The allocated amount of bits can be written as:

$$ABIT_{slice} = \left(\frac{ACT_{slice}}{ACT_{frame}}\right) ABIT_{frame} \quad (8)$$

The third activity-extractor 74 extracts the activity with respect to each DCT block, which is output by obtaining the activity of a block by summing non-zero AC coefficients. The second bit-allocator 75 is for assigning bits to blocks, which outputs the bits allocated to each block to variable-length coder 50 in accordance with the ratio of the block activity produced with respect to the amount of bits allocated to the entire slices. Therefore, the block activity can be allocated by the ratio of block activity with the activity of the slice. The allocated amount of bits for each block can be expressed by the following equation.

$$ABIT_{block} = \left(\frac{ACT_{block}}{ACT_{slice}}\right) ABIT_{slice} \quad (9)$$

The quantization step size controller 80, which is composed of a quantization table recommended by the ISO and a multiplier (not shown) for multiplying the scaling factor in accordance with the quantization interval control signal from the second activity-extractor 72, controls the quantization step size of the quantizer 40.

A VLC processor 50, which encodes using the general Huffman entropy code, codes a DC coefficient using DPCM and codes AC components after performing zig-zag scanning. In particular, the VLC is carried out by DPCM between neighboring coding units such as the DC coefficients by a motion vector supplied from the motion-estimating unit 60.

The record format controller 90 controls the record format on the recording medium in accordance with the output signal of the variable-length coder 50. Specifically, it counts the number of bits from the variable-length coder 50 and supplies the amount of bits detected by the counting to the second activity-extractor 72 as a reference value for determining the scaling factor. Also, a control signal is output to the recorded information classifying unit 100 to classify the principal information and the remaining information.

The record format embodied in the present invention is carried out such that the output code is recorded on eight tracks with the intraframe and predicted frame as a paired unit of two frames for normal playback, and the IDC is recorded at predetermined intervals for trick playback. Accordingly, one macro block of the intraframe corresponds to one IDC. One frame has an effect of fixing bits in units of 1350 macro blocks. The fixing of bits is carried out in units of two frames in the DDC region (excluding the IDC region).

FIG. 4 illustrates the record format of the IDC and DDC to the coded unit. Generally, the coded amount during intraframe coding is greater than that during a predicted frame. Therefore, the DC coefficient and AC coefficients of the low frequency component within the intraframe are recorded on the IDC region. An ID number and remaining information such as quantization step size are also recorded to be played back, even though they are read out independently of the recorded order during the trick playing. The AC coefficients of those frequencies remaining after recording in the IDC region are recorded on the DDC region. The predicted frame which can be dependently restored only after the information of the intraframe is restored, is recorded in the DDC region. Here, the coded amount is small since the coding is performed by considering the time-base correlation. As a result, only the IDC is decoded and played back on the screen while performing the trick playing, and both the IDC and DDC are decoded and a detailed image is played back while performing normal playing.

When the information coded in the variable-length coder 50 is supplied, the recording information classifying unit 100 is controlled by the selecting control signal from the record format controller 90 via the first selector 110, thereby supplying, in the case of principal information, the coded information to the IDC buffer 120 of the next stage, and otherwise outputting to the DDC buffer 130 for the remaining information, as described above. The IDC buffer 120 and the DDC buffer 130 are respectively operated as general buffers, so that the supplied signal is temporarily stored and then output to the second selector 140 of the next stage. In accordance with the selecting control signal from the record format controller 90, the second selector 140 selects signals from the buffers 120 and 130 of the previous stage, to allow the output signal to be recorded according to the above-described record formation. Here, first selector 110 may be comprised of a demultiplexer and second selector 140 may be comprised of a multiplexer.

When decoding the information which was recorded by coding, as contrary to that during coding, the playback signals are merged to form the divided and recorded information as a block unit. According to the merging order, an intraframe is variable-length-decoded, and then restored by performing inverse quantization and IDCT. In case of a predicted frame, the motion vector of the predicted frame is decoded to compensate for changes from the previous frame, and the motion vectors are added to completely restore the coordinates of its position. Here, each information signal (IDC and DDC) is recorded together with ID information, so that even if the order of recording on the recording medium in units of two frames is carried out randomly, playback can be carried out normally.

In the present invention as described above, the principal information and the remaining information are recorded in each predetermined region by processing VLC, so that the coding is performed by employing one encoding method. Also, a greater amount of information can be played back not only during normal reproduction but also during trick playback. Moreover, the circuitry can be simplified by using one encoding method, which lowers the price of the end product. Furthermore, the output bit amount is controlled by extracting the activity using two steps for slice and block activity before coding, thereby preventing the partial impairment of picture quality due to the coding.

What is claimed is:

1. An image compression coding method for compressing a supplied digital image signal, performing a discrete cosine transform of the signal, linearly quantizing the signal, and performing variable length coding, in order to improve recording efficiency, comprising the steps of:

detecting regions of principle information and remaining information of the digital image signal by counting a number of bits generated by performing the variable length coding; and controlling a record format to alternately record onto recording media in an equal interval the principle information and the remaining information among the information generated by performing variable-length coding in units of a block of a predetermined size according to the regions detected in said region-detecting step.

2. An image compression method as claimed in claim 1, wherein said record format controlling step is carried out by processing the bits output by performing the variable-length coding according to the counted number of bits via separate transmission paths with respect to the principle information and the remaining information.

3. An image compression method as claimed in claim 1 further comprising the steps of:

estimating motion in relation to previous frame information formed by restoring a quantized discrete cosine transform coefficient by comparing the previous frame information with current frame information of the supplied digital image signal; and performing a discrete cosine transform and quantizing an error signal of the previous frame information and the current frame information detected during said motion-estimating step, to process the error signal as a frame dependent from the previous frame.

4. An image compression apparatus including a discrete cosine transform unit for performing a discrete cosine transform of a supplied digital image signal to provide a transform coefficient, a quantizing unit for linearly quantizing the transform coefficient output from the discrete cosine transform unit, and a variable-length coding processor for performing a variable-length coding of the quantized coefficient generated from the quantizing unit, said apparatus for compressing an image signal to improve recording efficiency, comprising:

a record format controller for controlling a format recorded in accordance with a number of coded bits generated by the variable-length coding processor; and a recorded information classifying unit, controlled by said record format controller, for classifying coded information output from the variable-length coding processor into principle information and remaining information, and processing the principle and the remaining information through respective transmission paths.

5. An image compression apparatus as claimed in claim 4, wherein said record format controller outputs a signal for controlling the format recorded by counting the number of coded bits.

6. An image compression apparatus as claimed in claim 4, wherein said recorded information classifying unit comprises:

a first selector for selectively outputting a signal output from the variable-length coding processor in accordance with an output signal of said record format controller;

a first transmission path for receiving the signal output from said first selector and processing the signal as the principle information, when the signal output from the variable-length coding processor is the principle information;

a second transmission path for receiving the signal output from said first selector and processing the signal as the remaining information, when the signal output from the variable-length coding processor is the remaining information;

a second selector for selectively outputting a signal processed in said first transmission path and a signal processed in said second transmission path in accordance with the signal output from said record format controller, to be alternately recorded onto a predetermined region of a recording medium.

7. An image compression apparatus as claimed in claim 6, wherein said first transmission path and said second transmission path respectively comprise a buffer.

8. An image compression apparatus as claimed in claim 6, wherein said first selector comprises a demultiplexer.

9. An image compression apparatus as claimed in claim 6, wherein said second selector comprises a multiplexer.

10. An image compression apparatus as claimed in claim 6 further comprising a motion-estimator for estimating motion between a current supplied image and a previous image in a frame unit formed by restoring a quantized coefficient in the quantizing unit, and supplying a difference of the previous image and the current image into the discrete cosine transform unit, to be coded.

11. An image compression coding method for compressing a supplied digital image signal, performing a discrete cosine transform of the signal, linearly quantizing the signal to provide a quantized coefficient, and performing variable length coding, in order to improve recording efficiency, said method comprising the steps of:

first extracting an activity by dividing the digital image signal into subframes and then detecting activities of each of the subframes;

second extracting an activity by accumulatively operating a result extracted in said first activity extracting step and then extracting the activity in units of a frame;

first bit allocating to allocate a number of bits in units of the subframe by the activities extracted in said first and second activity-extracting steps;

third extracting an activity to extract activity of a predetermined block by the quantized coefficient; and second bit allocating to allocate a number of bits corresponding to the block based on the activity of the block extracted in said third activity-extracting step and on the number of bits assigned in said first bit-allocating step.

12. An image compression method as claimed in claim 11 further comprising the step of controlling a quantization step size of a current frame based on a number of coded bits of the variable-length coding corresponding to a previous frame after performing said second activity-extracting step.

13. An image compression method as claimed in claim 11, wherein said third activity-extracting step is carried out by adding nonzero AC coefficients among the quantized coefficients.

14. An image compression method as claimed in claim 11 further comprising the steps of:

detecting regions of principle information and remaining information of the digital image signal by counting a number of bits generated by performing the variable length coding; and controlling the record format to alternately record onto recording media in an equivalent interval the principle information and the remaining information among the information generated by performing variable-length coding in units of a block of a predetermined size according to the regions detected from said region-detecting step.

15. An image compression method as claimed in claim 14, wherein said record format controlling step processes the bits output by performing the variable-length coding according to the counted number of bits via separate transmission paths with respect to the principle information and the remaining information.

16. An image compression method as claimed in claim 14 further comprising the steps of:

estimating motion in relation to previous frame information formed by restoring a quantized discrete cosine transform coefficient by comparing the previous frame information with current frame information of the supplied digital image signal; and performing a discrete cosine transform and quantizing an error signal of the previous frame information and the current frame information detected during said motion-estimating step, to process the error signal as a frame dependent from the previous frame.

17. An image compression apparatus including a discrete cosine/transform unit for performing a discrete cosine transform of a supplied digital image signal to provide a transform coefficient, a quantizing unit for linearly quantizing the transform coefficient generated from the discrete cosine transform unit, and a variable-length coding processor for performing a variable-length coding of the quantized coefficient generated from the quantizing unit, said apparatus for improving the recording efficiency comprising:

a first activity-extractor for dividing the digital image signal into subframe units and then detecting activity of each subframe unit;

a second activity-extractor for accumulatively operating a result extracted in said first activity-extractor and then extracting the activity in units of a frame;

a first bit allocator for allocating a number of bits in units of the subframe by the activities extracted in said first and second activity extractors;

a third activity-extractor for extracting activity of a predetermined block by the quantized coefficient; and a second bit allocator for allocating a number of bits corresponding to the block based on the activity of the block extracted in said third activity-extractor and on the number of bits allocated in said first bit allocator.

18. An image compression apparatus as claimed in claim 17 further comprising a quantization step size controller for generating a signal used for controlling a quantization step size corresponding to a present frame based on a number of coded bits of the variable-length coding corresponding to a previous frame in said second activity-extractor and outputting the signal to said quantizing unit.

19. An image compression apparatus as claimed in claim 17, wherein the activity of said third activity-extractor is extracted by counting non-zero AC coefficients among the quantized coefficients output from said quantizing unit.

20. An image compression apparatus as claimed in claim 17, wherein said image compression apparatus further comprises:
   a record format controller for controlling a format recorded in accordance with a number of coded bits generated by the variable-length coding processor; and
   a recorded information classifying unit controlled by said record format controller, for classifying coded information output from the variable-length coding processor into principle information and remaining information, and processing the principle and the remaining information through respective transmission paths.

21. An image compression apparatus as claimed in claim 20, wherein said record format controller outputs a signal for controlling the format recorded in accordance with a coefficient of the bits.

22. An image compression apparatus as claimed in claim 20, wherein said recorded information classifying unit comprises:
   a first selector for selectively outputting a signal output from the variable-length coding processor in accordance with an output signal of said record format controller;
   a first transmission path for receiving the signal output from said first selector and processing the signal as the principle information, when the signal output from the variable-length coding processor is the principle information;
   a second transmission path for receiving the signal output from said first selector and processing the signal as the remaining information, when the signal output from the variable-length coding processor is the remaining information;
   a second selector for selectively outputting signals processed in said first transmission path and signals processed in said second transmission path in accordance with the signal output from said record format controller to be alternately recorded onto a predetermined region of a recording medium.

23. An image compression apparatus as claimed in claim 22, wherein said first transmission path and said second transmission path respectively comprise a buffer.

24. An image compression apparatus as claimed in claim 22, wherein said first selector comprises a demultiplexer.

25. An image compression apparatus as claimed in claim 22, wherein said second selector comprises a multiplexer.

26. An image compression apparatus as claimed in claim 22 further comprising a motion-estimator for estimating motion between a current supplied image and a previous image in a frame unit formed by restoring a quantized coefficient in the quantizing unit, and supplying a difference between the previous image and the present image into the discrete cosine transform unit, to be coded.

27. An image decompressing method for decoding principle information and remaining information recorded, respectively, on separate regions after performing variable-length coding of a digital image signal, said method comprising the steps of:
   merging reproduced signals to restore the information allocated and recorded on the separate regions, in units of predetermined blocks according to a number of coded bits of the predetermined blocks; and
   restoring image data by a variable-length decoding method according to a merging order in said merging process, inverse-quantizing the restored data and performing an inverse discrete cosine transform.

28. An image decompressing apparatus for performing variable-length coding of a digital image signal according to, respectively, principle information and remaining information, and decoding the information recorded on separate regions, said apparatus comprising:
   a merging unit for merging the reproduced signal to restore the information allocated and recorded on the separate regions, in units of predetermined blocks according to a number of coded bits of the predetermined block units;
   a variable-length decoder for variable-length decoding according to a merging order in said merging unit; and
   a restoring unit for restoring the bits decoded in said variable-length-decoder by inverse-quantizing the restored bits and by performing an inverse discrete cosine transform.

* * * * *